United States Patent
Chen et al.

(10) Patent No.: US 12,307,653 B1
(45) Date of Patent: May 20, 2025

(54) SURFACE DEFECT DETECTION METHOD, SYSTEM, EQUIPMENT, AND TERMINAL THEREOF

(71) Applicant: Hubei University, Wuhan (CN)

(72) Inventors: Kansong Chen, Wuhan (CN); Zhihao Xi, Wuhan (CN); Zuyang Liu, Wuhan (CN); Yanyu Chen, Wuhan (CN)

(73) Assignee: Hubei University, Wuhan (CN)

( * ) Notice: Subject to any disclaimer, the term of this patent is extended or adjusted under 35 U.S.C. 154(b) by 0 days.

(21) Appl. No.: 18/965,023

(22) Filed: Dec. 2, 2024

(30) Foreign Application Priority Data

Jan. 11, 2024 (CN) .......................... 202410042044.4

(51) Int. Cl.
| | |
|---|---|
| *G06T 7/00* | (2017.01) |
| *G06V 10/50* | (2022.01) |
| *G06V 10/54* | (2022.01) |
| *G06V 10/75* | (2022.01) |

(52) U.S. Cl.
CPC ............ *G06T 7/001* (2013.01); *G06V 10/507* (2022.01); *G06V 10/54* (2022.01); *G06V 10/751* (2022.01); *G06T 2207/20016* (2013.01)

(58) Field of Classification Search
CPC .......... G06T 7/001; G06T 2207/20016; G06V 10/507; G06V 10/54; G06V 10/751
See application file for complete search history.

(56) References Cited

U.S. PATENT DOCUMENTS

| | | | | |
|---|---|---|---|---|
| 2017/0309024 A1* | 10/2017 | Kitamura | ................. | G06T 7/11 |
| 2018/0014902 A1 | 1/2018 | Kitamura et al. | | |
| 2019/0073760 A1* | 3/2019 | Wang | ..................... | G06T 7/001 |

FOREIGN PATENT DOCUMENTS

| | | | | |
|---|---|---|---|---|
| CN | 104933434 A | | 9/2015 | |
| CN | 109685766 B | * | 7/2023 | ........... G06K 9/4642 |
| CN | 116862917 A | | 10/2023 | |

* cited by examiner

*Primary Examiner* — Samir A Ahmed
(74) *Attorney, Agent, or Firm* — Nitin Kaushik

(57) ABSTRACT

The disclosure discloses a surface defect detection method, system, equipment, and terminal, comprising: S1, LBP operator: before comparing the benchmark image with the actual shot image, a LBP texture feature extraction algorithm is first used for pre-processing; S2, Sift feature-point matching: adding a Sift feature-point matching algorithm to calculate key feature points in the image and compare; S3, defect detection: when the local feature points of the shot image are successfully matching with a certain image in the benchmark image library, a detailed comparison will be made and complete defect detection. The disclosure integrates various image processing methods in advance without any setting by users. After running the system with one click, it can automatically perform detection, greatly reducing personnel training costs. The disclosure has simple structure and low cost. The basic structure only needs a computer, camera, and light source, making it easy to use and with highly mobile.

5 Claims, 18 Drawing Sheets

(a)  (b)  (c)

(a) (b)

(a) Photosensitive controller (a) ring light source (a)      (b)

(c)      (d)

SURFACE DEFECT DETECTION METHOD, SYSTEM, EQUIPMENT, AND TERMINAL THEREOF

CROSS-REFERENCE TO RELATED APPLICATIONS

The application claims priority to Chinese patent application No. 2024100420444, filed on Jan. 11, 2024, the entire contents of which are incorporated herein by reference.

TECHNICAL FIELD

The disclosure relates to a field of machine vision technology, and more particular to a surface defect detection method, system, equipment, and terminal thereof.

BACKGROUND

Machine vision defect detection is an essential requirement in industrial production. Many items may have certain defects on their outer surface due to various factors during production, such as oil stains and scratches on steel surfaces, holes or snagging on fabric surfaces, printing errors or other damages on packaging boxes, and so on. The main purpose of using machine vision for inspection is to improve the current situation of traditional manual visual recognition of defects, making the inspection more scientific and digital. The research on using machine vision for defect detection in China started later than in developed countries. Prior to 1990, relevant research was only conducted in universities and scientific research institutes. With the rapid development of machine vision technology, there are more and more software and applications that use machine vision to detect surface defects on manufacturing automation production lines, greatly improving production efficiency. At the 2009 Asia International Label Exhibition held in Shanghai, the Print STAR printing inspection system, which integrates process control and quality control, was showcased. Domestic Dongfuda Technology Company also has various product surface defect detection systems, such as steel detection, non-woven fabric detection, film detection, lithium battery detection, etc. Foreign brands such as Keyence and Cognex fully meet the actual production needs in terms of accuracy and detection speed.

Based on above analysis, the problems and defects of the prior art are:

1. Although most prior software systems have good performance in accuracy, most of them use deep learning to train models that only detect specific items and cannot achieve universality. Whenever the detected object changes, the model needs to be retrained, which requires a large amount of data support and high labor and time costs.

2. Detection systems using traditional visual algorithms often suffer from poor stability and weak resistance to external interference.

3. The software has a large volume and complex usage methods. Currently, most software has a large overall volume due to embedded models or complex processes. Many parameters require front-line workers to operate and set, resulting in high learning costs for workers.

SUMMARY

Aiming at problems in prior art, the disclosure provides a surface defect detection method, system, equipment, and terminal thereof.

The present disclosure is implemented as follows: a surface defect detection method, comprising:

S1, LBP operator: before comparing a benchmark image with an actual shot image, a LBP texture feature extraction algorithm is first used for pre-processing; and S2, improved Sift feature-point matching: adding an improved Sift feature-point matching algorithm, developing a gradient direction formula, calculating key feature points in the image, and matching spatial information of the feature points; and S3, defect detection: When local feature points of the actual shot image are successfully matched with an image in a benchmark image library, the two images will be compared in detail according to a multi-color fusion comparison method, so as to find out difference points and complete the defect detection.

Further, in the step S1, a common LBP formula is implemented as follows:

$$LLP_{P,R}^{rot}=\min\{ROR(LBP_{P,R},i)|i=0,\ldots,P-1\}$$

wherein: LBP represents a pixel difference between a pixel point and its surrounding 8 neighboring points, so when light changes, pixel values and surrounding pixel values increase or decrease at the same time, so a pixel-value difference remain unchanged, thus increasing ability to resist external light interference; P represents the number of pixels around a central point, R represents a size of a grid radius, a pixel grid can be expanded to any grid size as needed;

Rot refers to different angles of rotation, and $ROR(x,i)$ refers to rotating of the LBP operator i times in a clockwise direction. The entire formula expresses an idea of continuously rotating a circular neighborhood to obtain a series of initial defined LBP values, and taking a minimum value as the LBP value for neighborhood. This ensures rotational invariance of the image, thereby achieving normal matching with the benchmark image and detection even if an object undergoes certain offset or rotation.

However, in actual shooting, there is often a lot of noise in images, and such simple processing cannot meet matching requirements. Therefore, we introduce f as critical value for effective features.

Further, the step S2 specifically comprising:

S201, constructing a Gaussian pyramid; and
S202, establishing a DOG Gaussian difference pyramid; and
S203, accurate positioning of key points; and
S204, main direction allocating of the key points; and
S205, features description of the key points; and
S206, completing feature-point matching through the key points matching using an original SIFT algorithm.

Furthermore, the step S201 specifically comprising:

The Sift feature-point matching algorithm first needs to construct an image pyramid model. The image pyramid model refers to continuously downsampling an original image to obtain a series of images of different sizes, forming a tower shaped model from large to small and from bottom to top; The original image is first layer of the pyramid, and a new image obtained from each downsampling is an upper layer of the pyramid (one image per layer), with a total of n layers in each pyramid; The number of layers in the pyramid is determined by an original size of the image and a size of the image at top of the pyramid. In order to reflect its continuity, the Gaussian pyramid adds Gaussian blur on basis of simple downsampling, making the image of each layer of the pyramid into multiple Gaussian blurred images, which are collectively called as Octave;

the Gaussian pyramid has a total of o groups, s layers, then there are:

$$\sigma(s)=\sigma_0 2^{s/S}$$

wherein the σ represents a scale space coordinate, the s represents a sub-level layer coordinate, $\sigma_0$ represents an initial scale, and S represents the number of layers in each group.

Furthermore, the step S204 specifically comprising: a direction of the key points is actually a gradient direction of local of the image. For key points detected in the DOG pyramid, gradient and direction distribution features of pixels within 3σ neighborhood window of the Gaussian pyramid images are collected. Firstly, calculating a image scale space:

wherein x, y, and σ respectively represent x, y coordinates and dimensions of the pixels, I represents a corresponding original image pixel, and * represents convolution operation.

$$L(x,y,\sigma)=G(x,y,\sigma)*I(x,y);$$

Then calculating an amplitude and direction of the gradient:

the amplitude of the gradient:

$$m(x, y) = \sqrt{(L(x+1, y) - L(x-1, y))^2 + (L(x, y+1) - L(x, y-1))^2};$$

the direction of the gradient:

$$\theta(x, y) = \tan^{-1}\left[\frac{L(x, y+1) - L(x, y-1)}{L(x+1, y) - L(x-1, y)}\right];$$

after calculating all gradient directions of the key points, a gradient direction of the key point with peak value is taken as the main direction, and gradient direction of the key points with 80% higher than the peak value is taken as the auxiliary direction;

for key points with multiple gradient directions, the disclosure recalculates the main direction and the amplitude of the gradient using following formula:

$$\sigma(x,y)=(\Sigma_{n=1}^{n}(1-\text{nor}(\max-m(x,y)))*\sigma(x,y))/n;$$

wherein, 'n' represents the number of directions, 'nor' represents normalization processing. After the normalization processing, a weight value of each direction is obtained, and 'max' represents the amplitude of the main direction. In this way, the main direction and the auxiliary direction are weighted to calculate a new main direction. As the multiple gradient directions are ultimately merged, each feature point only has one gradient direction, which significantly improves probability of successful feature-point matching.

Furthermore, the step S205 specifically comprising: for each key point, there are three pieces of information: location, scale, and direction; establishing a descriptor for each key point, describing the key point with a set of vectors, so that it does not change with various changes. The descriptor not only includes the key point, but also the pixels around the key point that contribute to it. And the descriptor should have high uniqueness to improve probability of matching the feature point correctly.

Further, in the step of S3, a specific comparison rule is as follows:
1. drawing a color gamut distribution map of the image, confirming overall color distribution is basically similar, and storing RGB values of the image separately in an array; and
2. performing binary operation on the benchmark image and the actual shot image, storing pixels in two sets of arrays respectively, and comparing one by one, calculating difference degree between the two sets of arrays, and calculating proportion of the difference points; and
3. finally, determining whether product is qualified according to following calculation formula;

$$\sum_1^n \alpha(R1-R2)+\beta(G1-G2)+\gamma(B1-B2)+(\varepsilon 1-\varepsilon 2)/n$$

wherein, α, β, γ represent three weight parameters respectively, which are adjusted according to actual application scenario; R1, G1, B1, ε1 represent RGB three channel color values and grayscale value of the benchmark image respectively; R2, G2, B2, ε2 represent three channel values and grayscale value of inspected image, respectively; the reason for using a comprehensive comparison of color and grayscale pixels here is that even for some objects with different colors, their pixel values may be the same after grayscale conversion, therefore, a combination of the grayscale and the RGB is used for co-comparison to judge.

Another aspect of the disclosure is to provide a surface defect detection system using the surface defect detection method, comprising:
a LBP operator module: before comparing the benchmark image with the actual shot image, the LBP texture feature extraction algorithm is first used for pre-processing; and
a Sift feature-point matching module: used to adding the Sift feature-point matching algorithm, calculating the key feature points in the image, and comparing the spatial information of the feature points; and
a visual self-learning module: simplifying operation of adding benchmark libraries and reducing difficulty of using the detection system; through the module, users can manually select areas needed to be tested in future; and
a defect detection module: when the local feature points of the actual shot image are successfully matched with the image in the benchmark image library, the two images will be compared in detail to identify the difference points and complete the defect detection.

Another aspect of the disclosure is to provide a computer equipment, the computer equipment comprising a memory and a processor; the memory stores computer programs, when the computer programs are executed by the processor, causing the processor to perform the steps of the surface defect detection method.

Another aspect of the disclosure is to provide a computer-readable storage medium, which storing computer programs; when the computer programs are executed by the processor, causing the processor to perform the steps of the surface defect detection method.

Another aspect of the disclosure is to provide an information data processing terminal for implementing the surface defect detection system.

Based on above technical solutions and technical problems solved, the advantages and positive effects of the technical solutions to be protected by the disclosure are:

Firstly, in view of the technical problems existing in the prior art and the difficulty of solving the problems, some creative technical effects are brought after solving the problems.

The specific description is as follows:

1. The disclosure adopts a complete OpenCV image processing algorithm instead of using deep learning training models for detection. Therefore, image comparison can be carried out without model training, and the benchmark image can be set through simple operation, and then using template matching method to automatically match the object to be detected with the benchmark image. Due to using the improved SIFT algorithm for image feature-point matching for detection, there is no need to consider the type of the object being detected. Only need to compare whether it is the same as the benchmark image in the image library and calculate the difference degree between the two images to obtain detection result. The method makes the applicability of the disclosure wider.

2. The disclosure integrates various image processing methods in advance without any setting by the user. After running the system with one click, it can automatically perform detection, greatly reducing personnel training costs.

3. Due to lack of embedded models and absence of deep learning frameworks, the disclosure is relatively small in size and can be applied to computers with various configurations.

4. The disclosure provides a simple and easy-to-use lightweight "self-learning" module, which facilitates users to operate the benchmark image library and simplifies complex operation of replacing inspected object.

5. The disclosure has a simple structure and low cost. The basic structure only needs a computer, camera, and light source to complete the construction, making it easy to use and good mobility.

Secondly, regarding the technical solution as a whole or from perspective of the product, the technical effects and advantages of the technical solution to be protected by the disclosure are described in detail as follows:

1. The disclosure proposes using template matching to make the product have a certain degree of "universality" while reducing application volume.

2. The disclosure improves the gradient direction calculation formula of SIFT feature-point matching algorithm for detecting defects in rigid materials, thereby enhancing accuracy.

3. The disclosure proposes a new defect detection judgment standard, which not only compares grayscale images, but also incorporates color influence of images into comparison formula, avoiding occurrence of different colors presenting the same color value after grayscale conversion.

4. The disclosure has developed a set of "self-learning" modules that simplify the operation of adding benchmark images according to the benchmark image library required by the template matching, which improves the user experience of the disclosure and reduces difficulty of using the disclosure.

5. The disclosure has developed a complete set of industrial defect detection solutions based on the improved SIFT feature extraction algorithm, including hardware solutions and software solutions.

Thirdly, the expected benefits and commercial value of the technical solution of the disclosure after conversion are as follows: the current market has defect detection equipment with a single unit value of about 20,0000-40,0000 yuan, and the hardware cost of the disclosure is low, so the price is relatively low while meeting production needs. The hardware cost of a single unit is 1,0000 yuan, and the sales unit price is only 5,0000 yuan. Therefore, it can quickly occupy small and medium-sized enterprise market and achieve annual sales of 30 million yuan in the next three years. The disclosure has a small size, high flexibility, good universality, and can adapt to various production lines, truly achieving plug and play functionality.

The technical solution of the disclosure fills technical gap in domestic and foreign industries: within our investigation scope, there are no other disclosure at home and abroad that use the improved SIFT matching algorithm for template matching and defect detection. This method is compatible with universality while ensuring timeliness. The pixel multi-index measurement method adopted in the disclosure improves accuracy of detection. Through comprehensive application of two strategies, the disclosure fills the gap in lack of defect detection systems that balance timeliness, accuracy, and universality at home and abroad.

The technical solution of the disclosure solves the technical problem that people have been eager to solve but have not yet succeeded in: previous methods were mainly divided into two types. One type is the deep learning method with fast real-time monitoring speed, although this method has extremely fast detection speed, even up to 80 fps, it usually requires a large amount of effective data sets to support, with extremely high labor costs and poor accuracy and flexibility, on average, it takes more than a week to replace the model each time; Another type is to use a common pixel alignment method, which performs well in accuracy but generally takes a lot of time. Therefore, people urgently need a method that can improve timeliness while ensuring accuracy, and the disclosure solves the problem.

The technical solution of the disclosure overcomes technical bias: in traditional cognition, people often believe that the speed of defect detection without using deep learning cannot meet production needs, or that ordinary defect detection methods cannot detect small defects. However, according to the processing flow of the disclosure, the accuracy of detection can be greatly improved and a lot of time can be saved.

The SIFT feature matching algorithm, when calculating gradient directions, the previous processing method where a single feature point will have multiple gradient directions. This has advantage of being able to obtain complete feature point information, and performs well in some images with more feature points, such as faces or complex landscape images. However, its performance is not as good as that of single product packaging or production information labels. Therefore, the disclosure chooses to abandon coexistence of multiple gradients and only retain a single key gradient, in order to improve the accuracy of defect detection through this method.

BRIEF DESCRIPTION OF DRAWINGS

In order to provide a clearer explanation of the technical solution of the embodiments of the disclosure, a brief introduction will be given below to the drawings required for use in the embodiments of the disclosure. It is obvious that the drawings described below are only some embodiments of the disclosure. For those skilled in the art, other drawings can be obtained based on these drawings without creative labor.

DETAILED DESCRIPTION OF THE EMBODIMENTS

Figure 1:
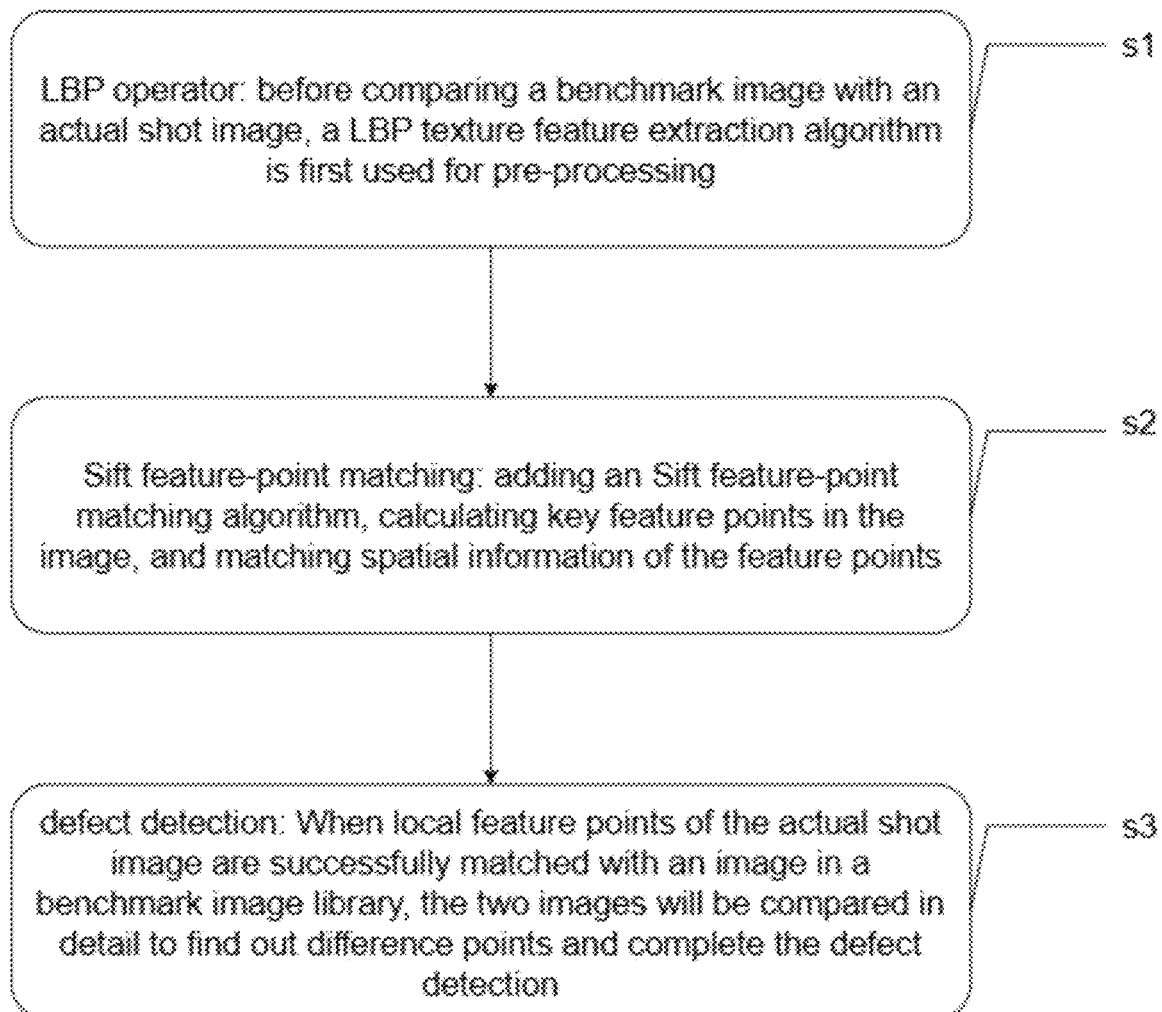
FIG. 1 is a flowchart of a surface defect detection method provided in an embodiment of the disclosure.

In order to make the purpose, technical solution, and advantages of the disclosure clearer and more understandable, the following will provide further detailed explanations of the disclosure in conjunction with embodiments. It should be understood that the specific embodiments described herein are only used to explain the disclosure and are not intended to limit the disclosure.

Aiming at the problems existing in prior art, the disclosure provides a surface defect detection method, system, equipment, and terminal. The disclosure will be described in detail below in combination with accompanying drawings.

The two specific application embodiments of the disclosure are:

Embodiment 1: Surface Detection of Vehicle Bodies in Automotive Manufacturing Industry This embodiment is used for production line detection of automobile bodies, which can quickly and accurately identify scratches, dents, or other surface defects, thereby ensuring high quality and consistency of the bodies.

In process of automobile manufacturing, the surface quality of the automobile bodies is crucial. Firstly, the LBP operator is used to pre-process the benchmark image and the actual shot image of the automobile bodies, in order to enhance the image's ability to resist changes in lighting.

Next, the Sift feature-point matching algorithm is applied to develop gradient direction formulas to calculate key feature points in the image, and spatial information comparison is performed to ensure accurate matching.

Finally, after successful feature-point matching between the two images, the system will perform a detailed comparison to identify any minor surface flaws or inconsistencies.

Embodiment 2: Surface Detection of Components in Electronic Product Assembly Lines In the electronic product assembly lines, this embodiment can be used to detect surface quality of components such as circuit boards and chips, quickly identify any cracks, scratches, or other defects, and ensure high quality standards for components and final products.

On the assembly line of electronic products, the surface quality of components directly affects the performance of the entire product. Pre-processing the benchmark images of electronic components and the actual shot images on the production line using the LBP operator to improve image stability.

Using the Sift feature-point matching algorithm, key feature points in the images are calculated and their spatial information is compared to ensure accurate matching.

After successful feature-point matching, comparing the two images in detail to discover any potential flaws or anomalies.

The disclosure mainly improves problems and defects in following prior art, achieving significant technological progress:

sensitivity to lighting conditions: traditional image processing methods are prone to failure when facing different lighting conditions, as changes in lighting can cause changes in pixel values, affecting the accuracy of defect detection;

rotation and scale change sensitivity: traditional image processing methods are difficult to accurately match and identify defects when objects undergo rotation or scale changes during shooting process;

efficiency of defect detection is not high: previous defect detection methods have low timeliness in processing large or complex image data, making it difficult to meet high-speed and high-precision requirements of industrial production.

The technical solution adopted by the disclosure in response to the problems existing in the prior art is:

application of the LBP operator (S1): Using the LBP operator for image pre-processing enhances robustness of the method to changes in lighting conditions; the LBP operator calculates the pixel difference between a pixel and its surrounding points, allowing the method to remain stable even when lighting changes;

the fusion of Sift feature-point matching algorithm (S2): introducing the Sift algorithm for feature-point matching improves adaptability of the method to rotation and scale changes; the Sift algorithm accurately locates key points by constructing Gaussian pyramids and DOG pyramids, and performs main direction assignment and feature description to effectively match feature points;

improving accuracy and efficiency of defect detection (S3): by combining the LBP operator and the Sift feature-point matching algorithm, the disclosure can more accurately and quickly detect defects in images while maintaining rotation invariance and illumination invariance;

wide applicability: The method of the disclosure is suitable for defect detection under various complex and changing environmental conditions, especially in field of industrial manufacturing, and can provide more reliable and efficient quality control means.

As shown in FIG. 1, the surface defect detection method provided by the embodiment of the disclosure includes:

S1, LBP operator: before comparing a benchmark image with an actual shot image, a LBP texture feature extraction algorithm is first used for pre-processing; and S2, Sift feature-point matching: adding an Sift feature-point matching algorithm, calculating key feature points in the image, and matching spatial information of the feature points; and S3, defect detection: When local feature points of the actual shot image are successfully matched with an image in a benchmark image library, the two images will be compared in detail, so as to find out difference points and complete the defect detection.

Figure 2:
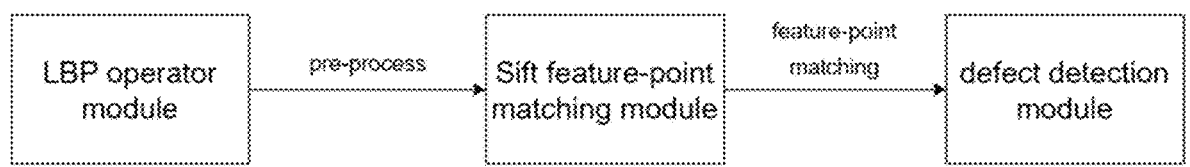
FIG. 2 is a structural diagram of a surface defect detection system provided in an embodiment of the disclosure.

As shown in FIG. 2, the surface defect detection system provided by the embodiment of the disclosure comprising:

LBP operator module: before comparing the benchmark image with the actual shot image, the LBP texture feature extraction algorithm is first used for pre-processing; and Sift feature-point matching module: used to adding the Sift feature-point matching algorithm, calculating the key feature points in the image, and comparing the spatial information of the feature points; and defect detection module: when the local feature points of the actual shot image are successfully matched with the image in the benchmark image library, the two images will be compared in detail to identify the difference points and complete the defect detection.

The disclosure proposes an industrial production solution for defect detection of various items through OpenCV image processing, including software and supporting hardware solutions.

Figure 3:
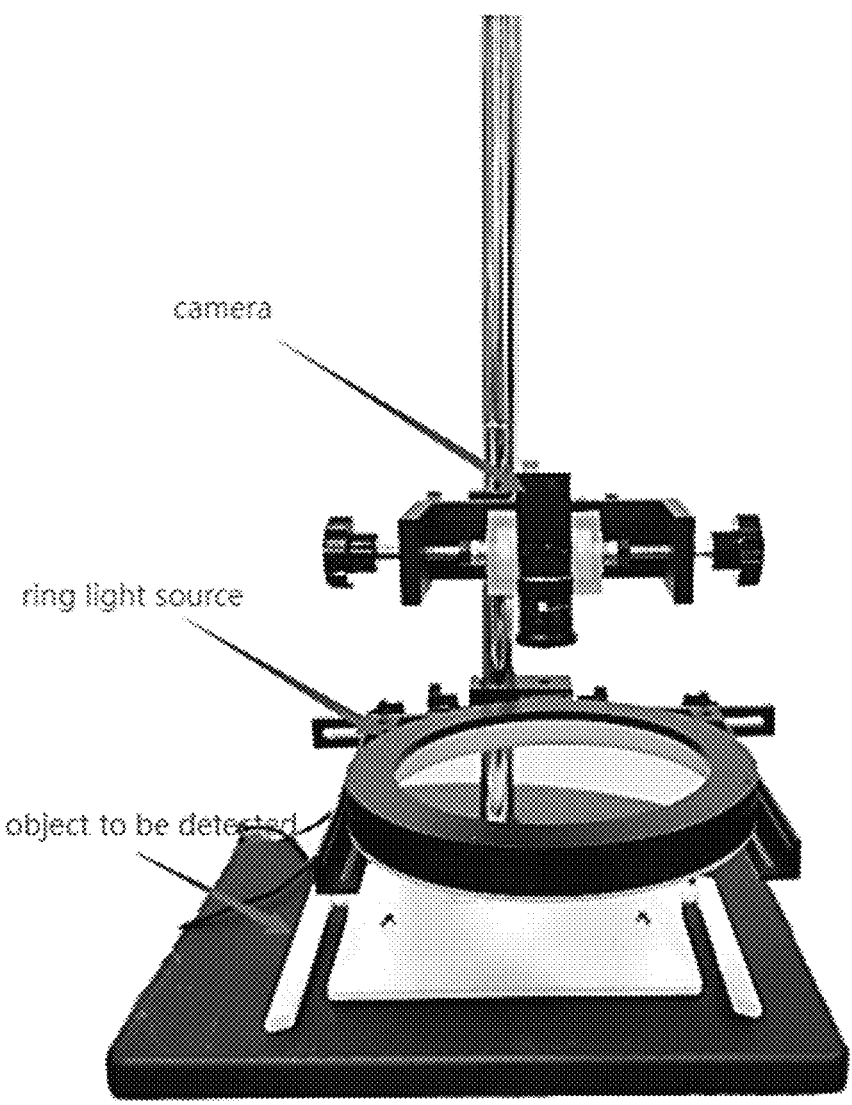
FIG. 3 is a schematic diagram of overall composition of the hardware solution provided by an embodiment of the disclosure.

The overall composition of the hardware solution is shown in FIG. 3.

The main hardware components include a Hikvision MV-CS050-60GM industrial camera, an industrial ring light source with a diameter of 24 cm, a photoelectric sensor, an equipment installation workbench, and a personal computer (CPU: Intel i3 processor or above, operating system: Windows 7 or above, memory: 2G or above).

Figure 4:
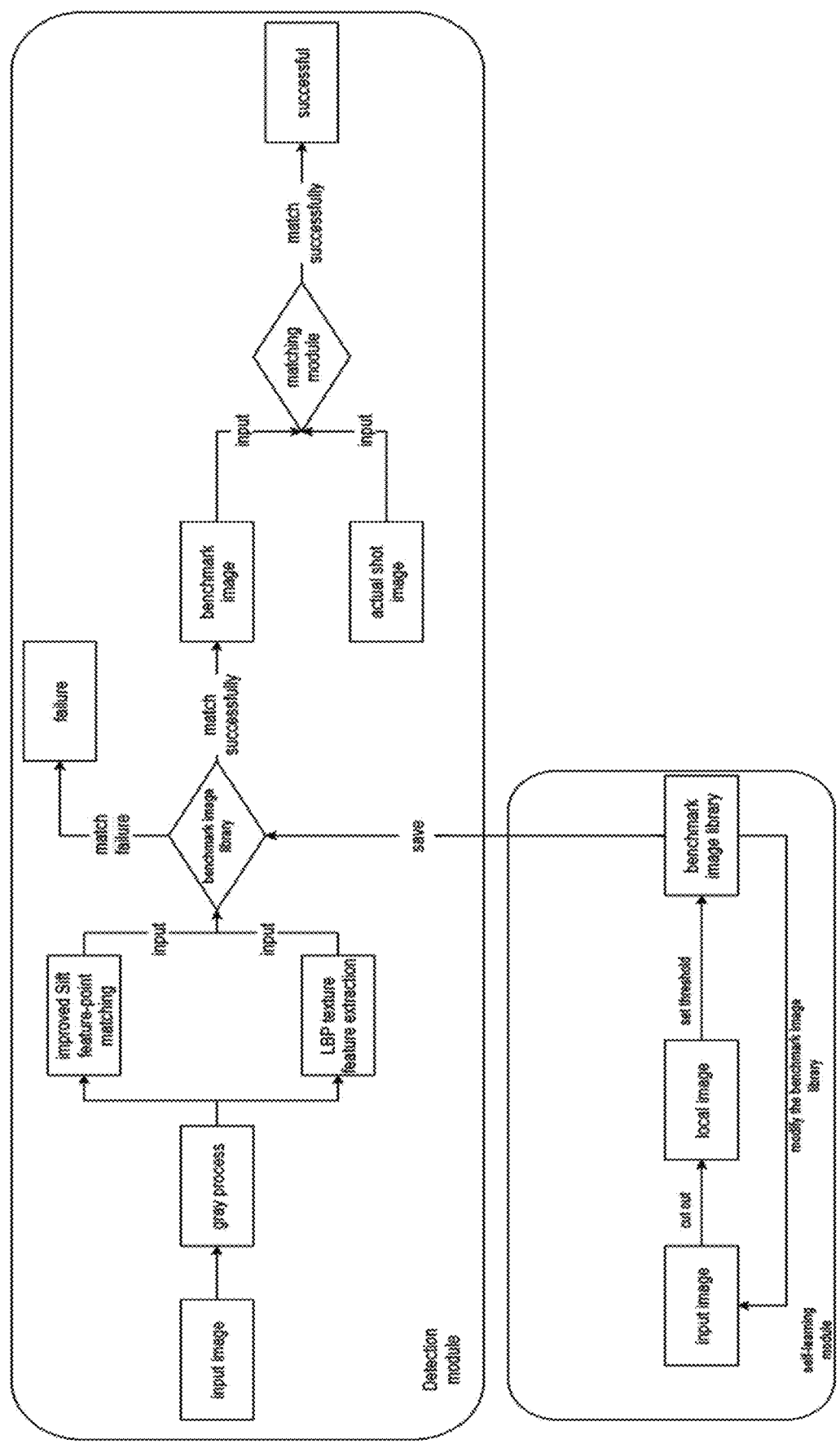
FIG. 4 is a workflow diagram provided by an embodiment of the disclosure.

The specific workflow is shown in FIG. 4:

1. LBP Operator

In order to make the overall defect detection solution lightweight, the disclosure adopts OpenCV as the main technology stack. However, if ordinary OpenCV image processing algorithms are directly applied to actual production, it often leads to detection errors due to offset of items on the production line. In order to solve such problems, the disclosure first uses the LBP texture feature extraction algorithm for pre-processing before comparing the benchmark image with the actual shot image. The LBP texture feature extraction operator has significant advantages in rotation invariance and grayscale invariance, wherein the rotation invariance ensures that objects can still be matched to the benchmark image normally even after small offsets, while the grayscale invariance reduces the impact of lighting on shooting, making the detection algorithm less sensitive to external interference and improving detection stability.

Figure 5:
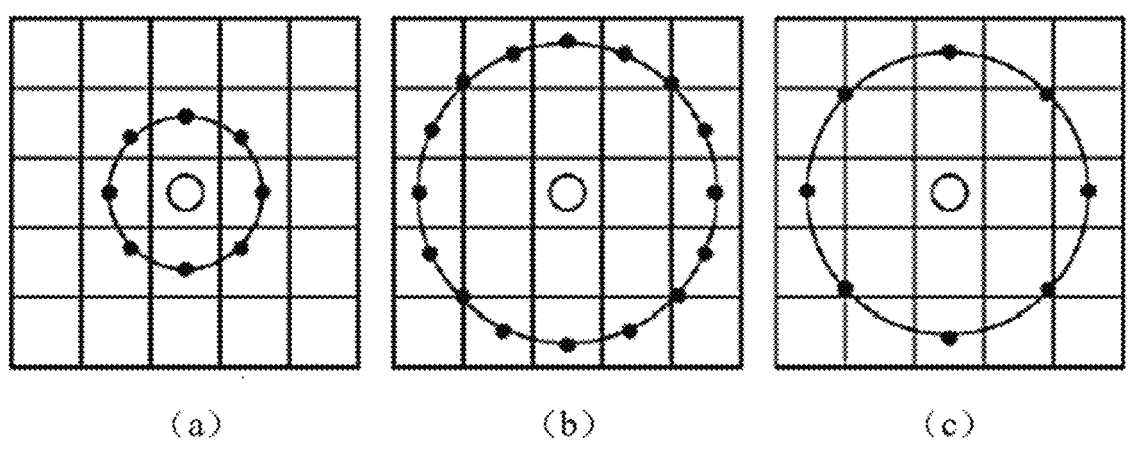
FIG. 5 is a schematic diagram of LBP provided by an embodiment of the disclosure; wherein: (a) $LBP_8^1$, (b) $LBP_{16}^2$, (c) $LBP_8^2$.

As shown in FIG. 5, the LBP formula is implemented as follows:

$$LLP_{P,R}^{rot}=\min\{ROR(LBP_{P,R},i)|i=0,\ldots,P-1\};$$

wherein: LBP represents a pixel difference between a pixel point and its surrounding 8 neighboring points, so when light changes, pixel values and surrounding pixel values increase or decrease at the same time, so the pixel difference remain unchanged, thus increasing ability to resist external light interference; P represents the number of pixels around the central point, R represents a size of a grid radius, a pixel grid can be expanded to any grid size as needed. The examples of LBP operators with pixel sampling points of 8, 1, and 8, radii of 1, 2, and 2 are shown in the FIG. 5.

Rot refers to different angles of rotation, and ROR(x,i) refers to rotating of the LBP operator i times in a clockwise direction. The entire formula expresses an idea of continuously rotating a circular neighborhood to obtain a series of initial defined LBP values, and taking a minimum value as the LBP value for neighborhood. This ensures rotational invariance of the image, thereby achieving normal matching with the benchmark image and detection even if the object undergoes certain offset or rotation.

2. Sift Feature-Point Matching

Through LBP texture feature matching algorithm, the disclosure solves the situation that the shot object cannot be detected normally if it is offset. However, if there are images with high overall similarity in appearance, the LBP algorithm cannot recognize and match them well.

Therefore, the disclosure additionally adds the Sift feature-point matching algorithm to calculate the key feature points in the image and compare the spatial information of the feature points.

(1) Constructing a Gaussian Pyramid

Figure 6:
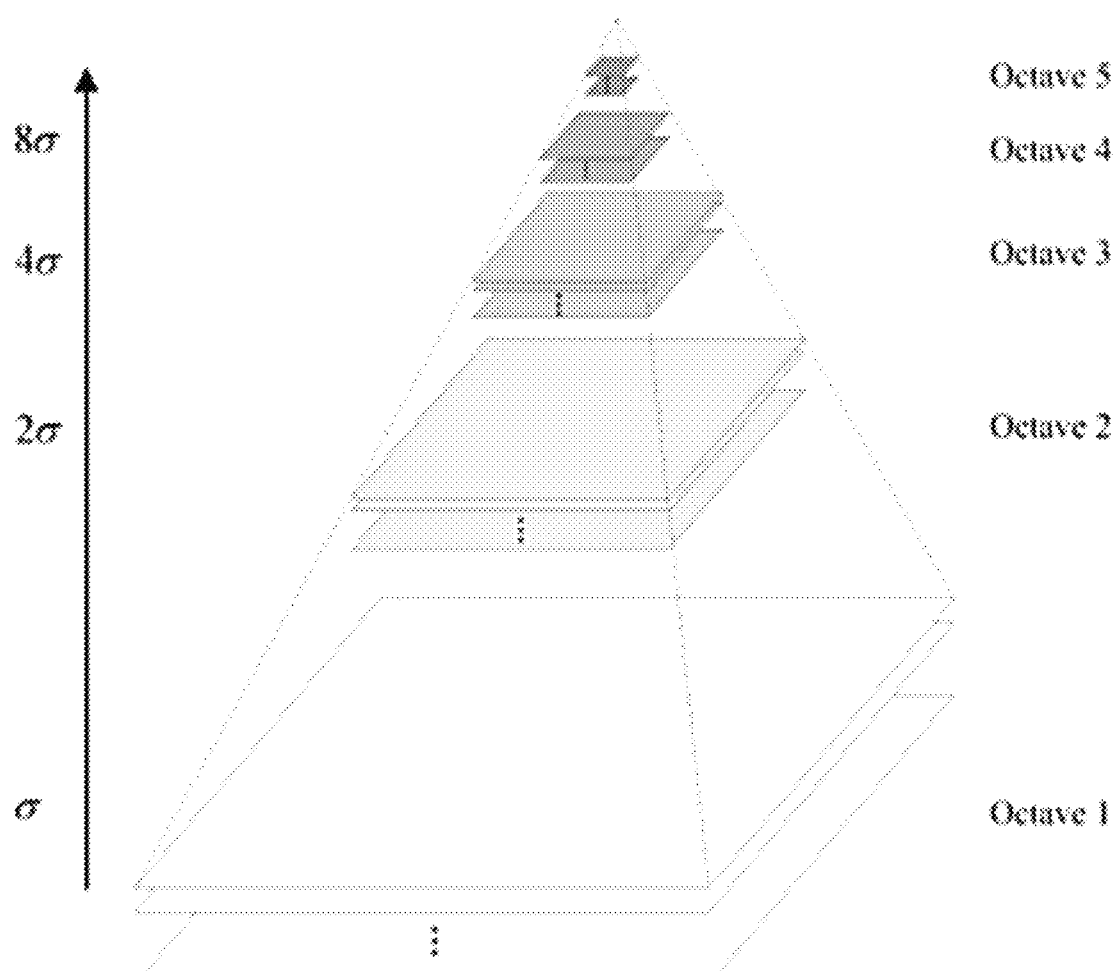
FIG. 6 is a schematic diagram of an image pyramid model provided by an embodiment of the disclosure.

As shown in FIG. 6, the Sift feature-point matching algorithm first needs to construct an image pyramid model. The image pyramid model refers to continuously downsampling an original image to obtain a series of images of different sizes, forming a tower shaped model from large to small and from bottom to top; The original image is first layer of the pyramid, and a new image obtained from each downsampling is an upper layer of the pyramid (one image per layer), with a total of n layers in each pyramid; The number of layers in the pyramid is determined by an original size of the image and a size of the image at top of the pyramid. In order to reflect its continuity, the Gaussian pyramid adds Gaussian blur on basis of simple downsampling, making the image of each layer of the pyramid into multiple Gaussian blurred images, which are collectively called as Octave;

the Gaussian pyramid has a total of o groups, s layers, then there are:

$$\sigma(s)=\sigma_0 2^{s/S};$$

wherein the σ represents a scale space coordinate, the s represents a sub-level layer coordinate, σ₀ represents an initial scale, and S represents the number of layers in each group.

(2) Establishing a DOG Gaussian Difference Pyramid

In order to effectively extract stable keypoints from the images, Gaussian difference kernels and convolutions of different scales are used for generation.

Afterwards, local extremum prediction is performed based on the DOG image, comparing each pixel with all its neighboring points to see if it is larger or smaller than its neighboring points in the image domain and scale domain.

(3) Accurate Positioning of Key Points

In order to improve stability of the key points, it is necessary to perform curve fitting on the scale space DOG function. Using symmetry of the DOG function in scale space, curve fitting is performed through Taylor expansion.

By taking a derivative and making the equation equal to zero, the offset of the extremum point can be obtained. When the offset is greater than 0.5, it indicates that a interpolation center has shifted to a nearby point. At this time, it is necessary to change the key point position. After repeated iterations in this way (five iterations were conducted in Lowe's paper), the accurate position of the feature points can be obtained.

Main Direction Allocating of the Key Points

A direction of the key points is actually a gradient direction of local of the image. For key points detected in the DOG pyramid, gradient and direction distribution features of pixels within 3σ neighborhood window of the Gaussian pyramid images are collected. Firstly, calculating a image scale space:

$$L(x,y,\sigma)=G(x,y,\sigma)*I(x,y);$$

wherein x, y, and σ respectively represent x, y coordinates and dimensions of the pixels, I represents a corresponding original image pixel, and * represents convolution operation.

Then calculating an amplitude and direction of the gradient:

the amplitude of the gradient:

$$m(x, y) = \sqrt{(L(x+1, y) - L(x-1, y))^2 + (L(x, y+1) - L(x, y-1))^2};$$

the direction of the gradient:

$$\theta(x, y) = \tan^{-1}\left[\frac{L(x, y+1) - L(x, y-1)}{L(x+1, y) - L(x-1, y)}\right];$$

Figure 7:
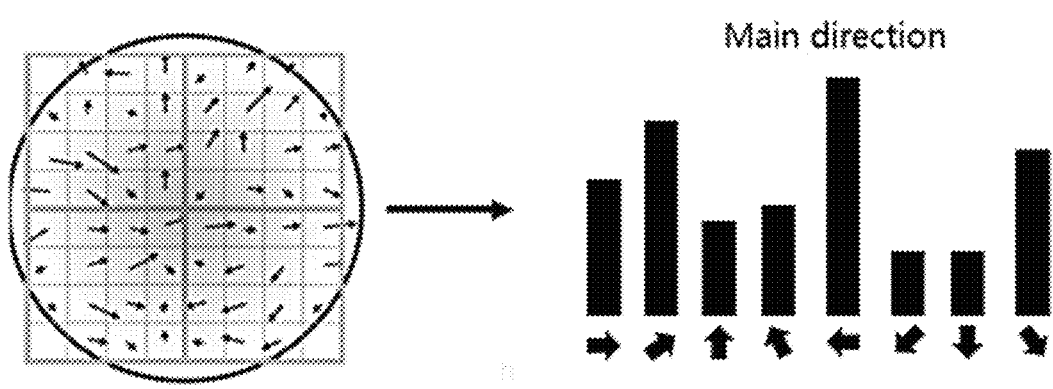
FIG. 7 is a schematic diagram of the main direction allocation of key points provided by an embodiment of the disclosure.

As shown in FIG. 7, after calculating all gradient directions of the key points, a gradient direction of the key point with peak value is taken as the main direction, and gradient direction of the key points with 80% higher than the peak value is taken as the auxiliary direction;

for key points with multiple gradient directions, the disclosure recalculates the main direction and the amplitude of the gradient using following formula:

$$\sigma(x,y)=(\Sigma_{n=1}^{n}(1-nor(max-m(x,y)))*\sigma(x,y))/n;$$

wherein, 'n' represents the number of directions, 'nor' represents normalization processing. After the normalization processing, a weight value of each direction is obtained, and 'max' represents the amplitude of the main direction. In this way, the main direction and the auxiliary direction are weighted to calculate a new main direction. As the multiple gradient directions are ultimately merged, each feature point only has one gradient direction, which significantly improves probability of successful feature-point matching.

(5) Features Description of the Key Points

Through above steps, for each key point, there are three pieces of information: location, scale, and direction; then establishing a descriptor for each key point, describing the key point with a set of vectors, so that it does not change with various changes, such as changes in lighting, viewing angle, etc. The descriptor not only includes the key point, but also the pixels around the key point that contribute to it. And the descriptor should have high uniqueness to improve probability of matching the feature point correctly.

The SIFT descriptor is a representation of a gradient statistical result of Gaussian images in the vicinity of keypoints. By dividing the image area around key points into blocks and calculating gradient histograms within each block, a unique vector is generated, which is an abstraction of the image information in that area and has uniqueness.

(6) Finally Completing Feature-Point Matching Through the Key Points Matching Using an Original SIFT Algorithm.

3. Defect Detection

When local feature points of the actual shot image are successfully matched with an image in a benchmark image library, the two images will be compared in detail according to a multi-color fusion comparison method, so as to find out difference points and complete the defect detection.

A specific comparison rule is as follows:

(1) drawing a color gamut distribution map of the image, confirming overall color distribution is basically similar, and storing RGB values of the image separately in an array; and (2) performing binary operation on the benchmark image and the actual shot image, storing pixels in two sets of arrays respectively, and comparing one by one, calculating difference degree between the two sets of arrays, and calculating proportion of the difference points; and (3) finally, determining whether product is qualified according to following calculation formula;

$$\Sigma_1^n\alpha(R1-R2)+\beta(G1-G2)+\gamma(B1-B2)+(\varepsilon1-\varepsilon2)/n;$$

wherein, α, β, γ represent three weight parameters respectively, which are adjusted according to actual application scenario; R1, G1, B1, ε1 represent RGB three channel color values and grayscale value of the benchmark image respectively; R2, G2, B2, ε2 represent three channel values and grayscale value of detected image, respectively; the reason for using a comprehensive comparison of color and grayscale pixels here is that even for some objects with different colors, their pixel values may be the same after grayscale conversion, therefore, a combination of the grayscale image and the RGB is used for co-comparison to judge.

Firstly, setting up the benchmark image library in advance on the benchmark image library page, selecting an area to be detected, and the system will capture the content as a benchmark image and store in the library. The entire process can be completed in a few seconds, and then the detection can begin.

Figure 8:
FIG. 8 is a schematic diagram of printing detection of outer packaging box of router provided by an embodiment of the disclosure.

Example 1: As shown in FIG. 8, it is the printing detection of the outer packaging box of the router.

Figure 9:
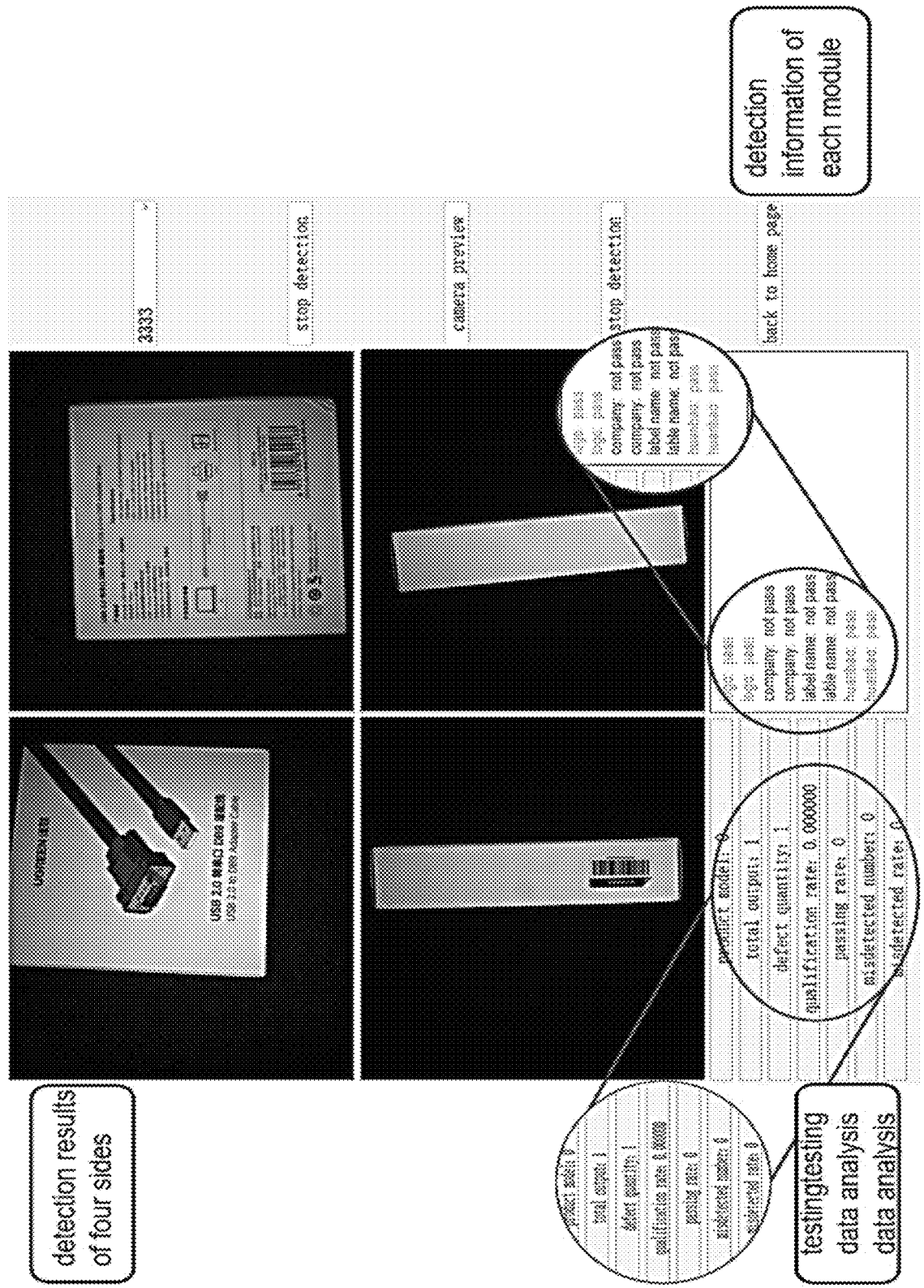
FIG. 9 is a schematic diagram of detection results provided by an embodiment of the disclosure.

As shown in FIG. 9, when the tested object is placed within the shooting range, the hardware triggering system will automatically trigger detection. The system will check whether there are any parts in the image that are the same as those in the benchmark image library. If there are no parts, it proves that the photographed object is not the object to be tested, and therefore the object will be reported as unqualified; If the match is successful, the image will be compared in detail with the benchmark image in the gallery. If the difference degree exceeds a specified range, it indicates that the object has defects and belongs to unqualified products.

Figure 10:
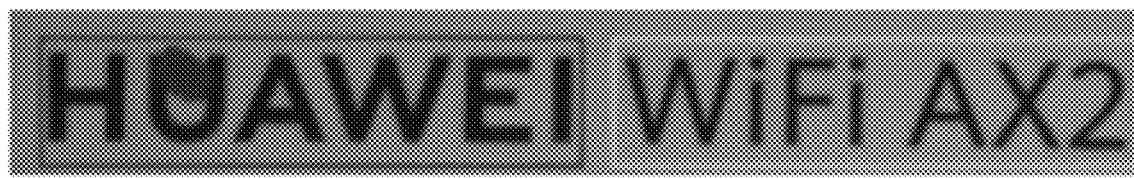
FIG. 10 is an enlarged view of a defect provided by an embodiment of the disclosure; wherein: (a) with defects, (b) without defects.

The enlarged image of the defect is shown in FIG. 10.

Figure 11:
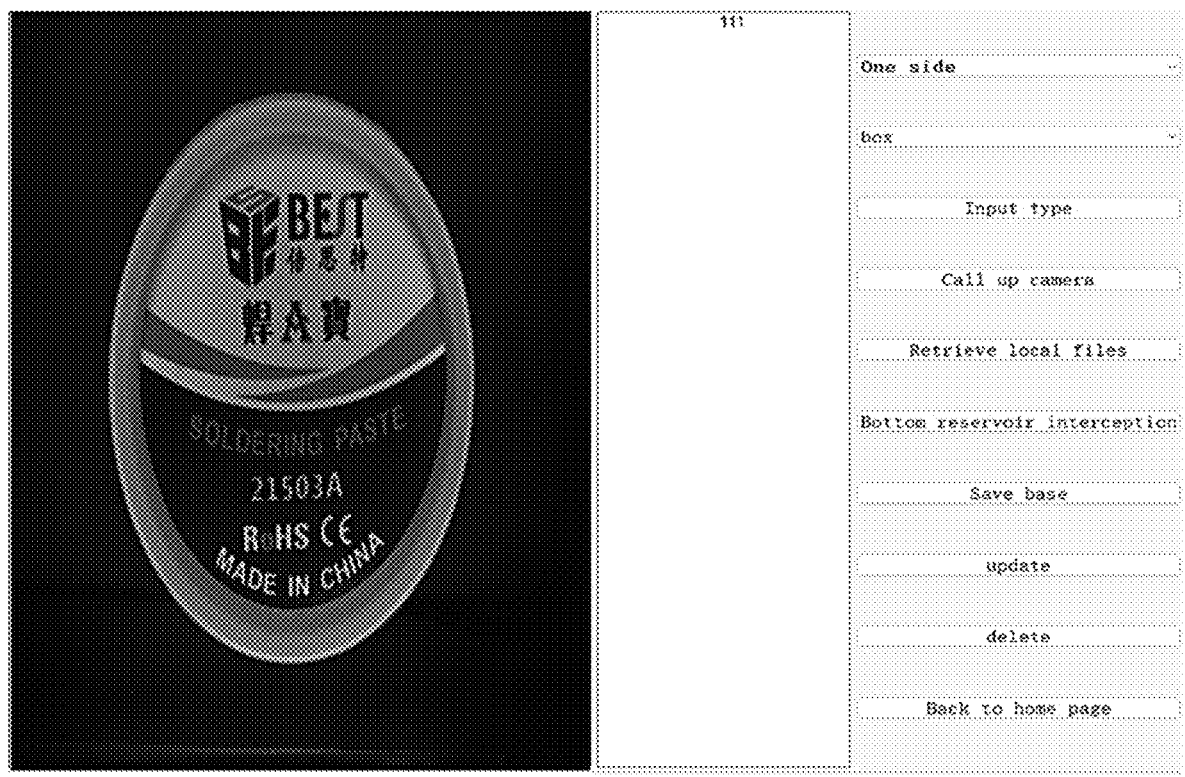
FIG. 11 is a schematic diagram of a modified welding rod sticker printing provided by an embodiment of the disclosure.

Example 2: As shown in FIG. 11, it is changed to welding rod sticker printing.

Figure 12:
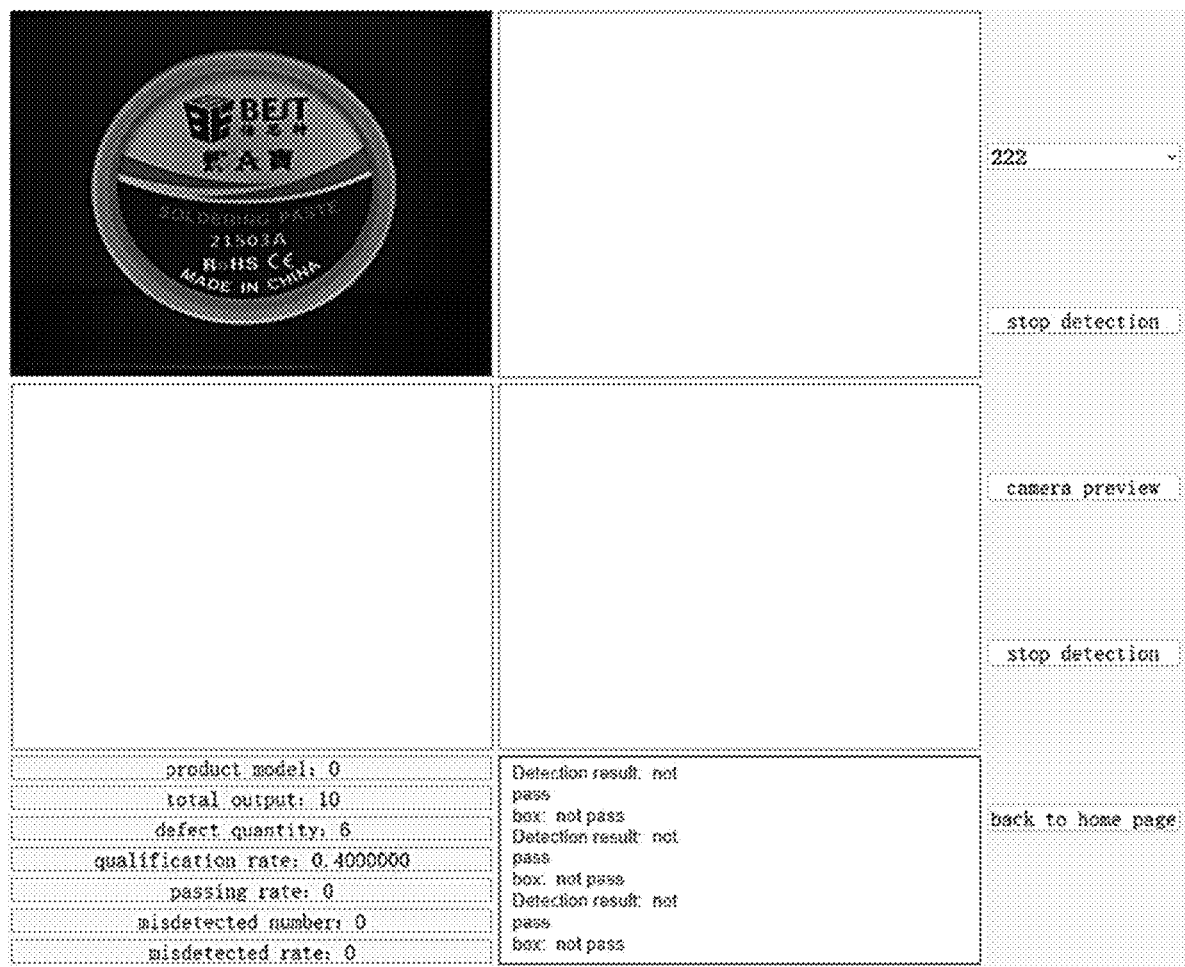
FIG. 12 is a schematic diagram of defect detection provided by an embodiment of the disclosure.

As shown in FIG. 12, the defect detection can be completed in just a few seconds by changing from detecting the router packaging box in Example 1 to detecting the welding rod sticker in Example 2.

Figure 13:
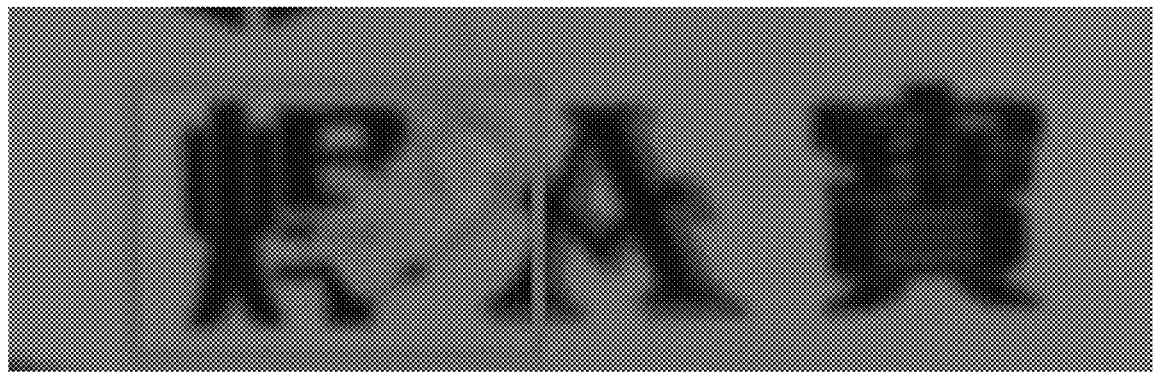
FIG. 13 is a schematic diagram of defect display provided by an embodiment of the disclosure.

The defect display is shown in FIG. 13.

Figure 14:
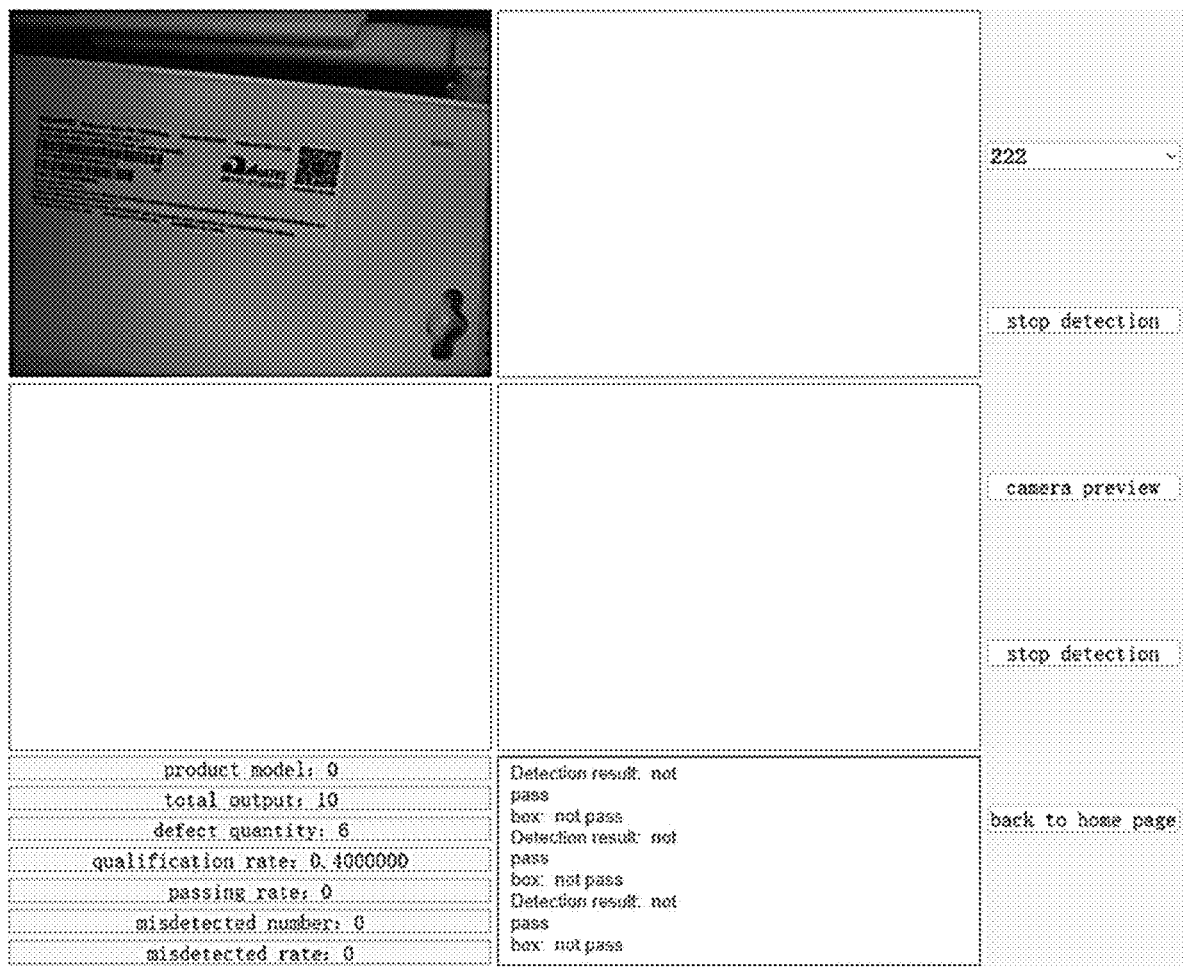
FIG. 14 is a schematic diagram of a router logic pattern printing detection provided by an embodiment of the disclosure.

Example 3: As shown in FIG. 14, the router logic pattern printing detection is shown.

The final effect is as follows:
 a single benchmark legend production time: 3 seconds;
 a single image detection time: 0.06 seconds;
 a matching accuracy of 2000 images using the ordinary SIFT algorithm is 95%;
 a matching accuracy of 2000 images with improved SIFT algorithm is 97%;
 2000 image detection accuracy: 99.8%.

Figure 15:
FIG. 15 is a schematic diagram of a 5 million pixel camera provided in an embodiment of the disclosure.

FIG. 15 is 5 million pixel camera that is used to capture images for detection.

Figure 16:
FIG. 16 is a schematic diagram of a photoelectric sensor embedded in a detection table base provided by an embodiment of the disclosure wherein: (a) a schematic diagram of the photoelectric sensor embedded in the detection table base, and (b) a schematic diagram of an annular light source.
Figure 16:

FIG. 16 (*a*) shows the photoelectric sensor embedded in the detection table base, in order to achieve automatic triggering detection. When an object is placed on the detection table, due to obstruction of the photosensitive sensor, a change in lighting is detected, triggering the detection.

and FIG. 16 (*b*) shows an annular light source, which solves problems such as shooting shadows or uneven imaging chromaticity.

Figure 17:
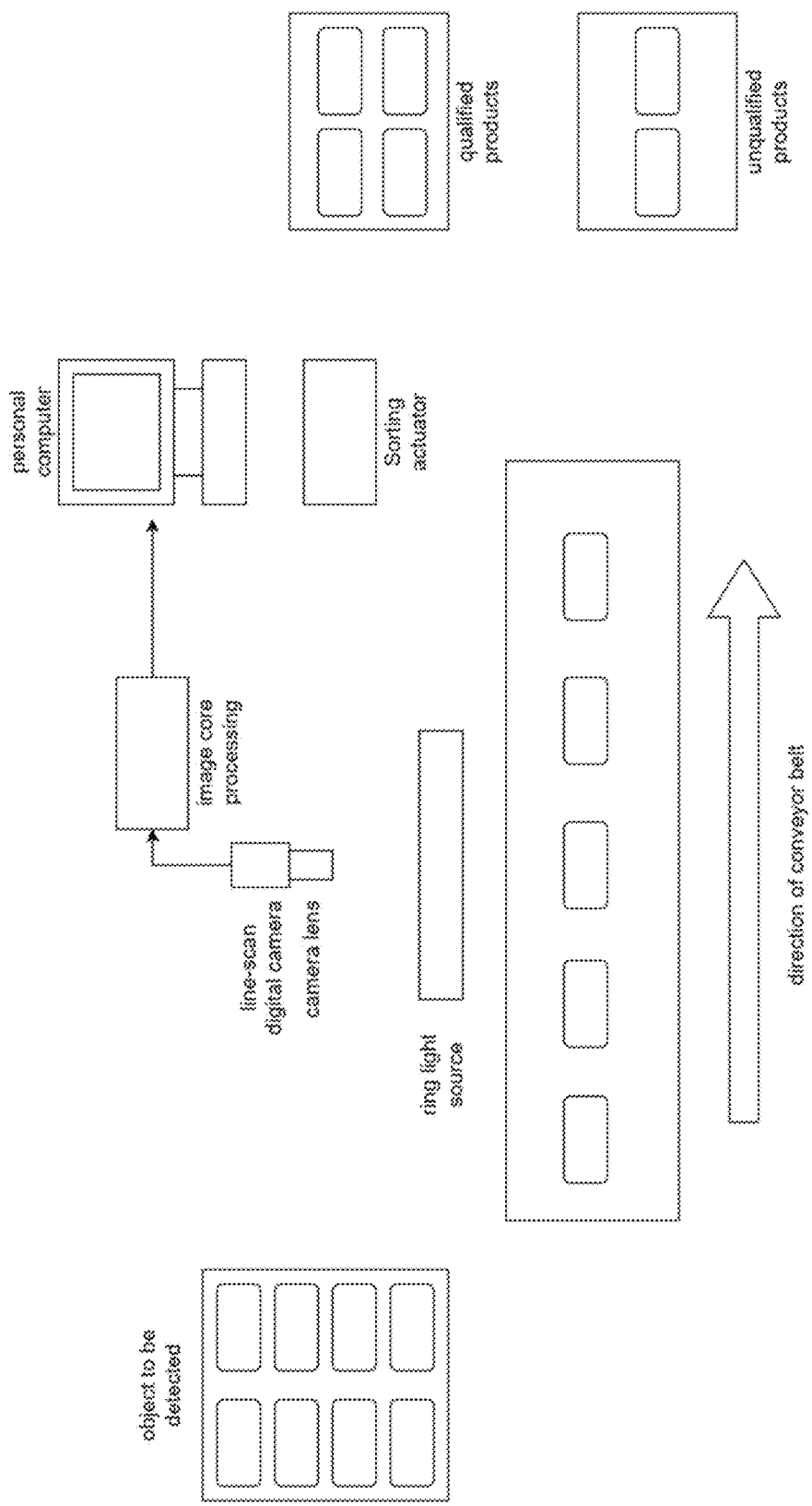
FIG. 17 is an overall layout diagram of the equipment provided by an embodiment of the disclosure.

FIG. 17 is an overall layout diagram of the equipment as a hardware solution for the entire production process.

An application embodiment of the disclosure is to provide a computer equipment, the computer equipment comprising a memory and a processor; the memory stores computer programs, when the computer programs are executed by the processor, causing the processor to perform the steps of the surface defect detection method.

An application embodiment of the disclosure is to provide a computer-readable storage medium, which storing computer programs; when the computer programs are executed by the processor, causing the processor to perform the steps of the surface defect detection method.

An application embodiment of the disclosure is to provide an information data processing terminal for implementing the surface defect detection system.

The disclosure has been applied in market and is currently mainly used for defect detection of product packaging before leaving the factory. The main application cases are router packaging boxes, as well as surface defect detection of bottle caps or other items. The types of detectable defects include misprint, miss printing, scratches, dirt, color errors, and etc.

The "self-learning" module of the disclosure (used to add functional modules for detecting new objects) can quickly record new types of detected objects, which has been proven in practical applications. Users can easily add benchmark image libraries without any professional knowledge after simple visualization operations.

To demonstrate excellent performance of the disclosure in terms of accuracy and universality, we designed a proof experiment to use three different tested objects for alternating detection, with each object being randomly placed for out of order detection.

1. Statistical Table of Experimental Results

| Detecting items | Number of detections | correct number of detections | Accuracy rate | Average detection time |
|---|---|---|---|---|
| part 1of the Router packaging box | 110 | 110 | 100% | 0.62 |
| part 2 of the Router packaging box | 110 | 110 | 100% | 0.65 |
| part 3 of the Router packaging box | 110 | 109 | 99% | 0.63 |
| Beer bottle cap A | 130 | 130 | 100% | 0.74 |
| Solder label | 110 | 110 | 100% | 0.60 |
| Beer bottle cap B | 130 | 129 | 99.2% | 0.69 |
| Beer bottle cap C | 130 | 130 | 100% | 0.69 |
| total | 830 | 828 | 99.7% | 0.66 |

Figure 18:
FIG. 18 is a partial detection sample diagram provided by an embodiment of the disclosure, wherein: (a) a diagram of qualified label detection, (b) a diagram of unqualified label detection, (c) a diagram of qualified solder label detection, and (d) a diagram of unqualified solder label detection.
Figure 18:

2. Partial Detection Sample Images are Shown in FIG. 18.

The above legend proves the disclosure is sensitive to defects, and can recognize defects below 100*100 pixels on a 4032*3036 pixel image with high accuracy. Multiple different tested objects were used in the experiment, which also proves that the disclosure has good universality. When adding new tested objects, there is no need for long-term model training, and the operation can be completed in seconds.

3. Comparative Experiment

To demonstrate the accuracy and time advantages of the disclosure, we compared it with other currently mature methods, and the measurement indicators are divided into:
 method name: the detection method used.
 accuracy: the average accuracy of multiple measurements of different objects or detection parts;
 time required to match new template: refers to the time required for the tested area to be successfully compared with the benchmark image library.
 average detection time: only the time consumed by the algorithm part is detected.

| Method name | Detection accuracy | Average detection time |
|---|---|---|
| Wavelet Transform Detection Algorithm | 0.95 | 1.68 s |
| Rule strip detection algorithm | 0.98 | 1.82 s |
| Gabor detection algorithm | 0.83 | 1.24 s |
| Yolov7-OBB | 0.90 | 0.01 s |
| Yolov7 | 0.88 | 0.01 s |
| Yolov5 | 0.91 | 0.01 s |
| Yolov5 + detection layer | 0.95 | 0.01 s |
| Segment defect detection and total area defect detection | 0.98 | 1.21 s |
| Comparison and detection method of the disclosure | 0.99 | 0.67 s |

From above experimental comparison table, it can be seen that deep learning methods have significant advantages in speed compared to traditional algorithms due to the use of pre-trained models. However, traditional algorithms generally have significantly higher accuracy than deep learning. The improved SIFT feature matching algorithm used in the disclosure has better performance in both accuracy and speed compared to traditional algorithms. Although it is slower in time compared to using pre-trained models, the accuracy obtained by second level delay is more important in production.

It should be noted that the embodiments of the disclosure can be implemented through hardware, software, or a combination of software and hardware. The hardware part can be implemented using dedicated logic; the software part can be stored in memory and executed by an appropriate instruction execution system, such as a microprocessor or specially designed hardware. Ordinary technicians in this field can understand that above equipments and methods can be implemented using computer executable instructions and/or contained in processor control code, such code is provided, for example, on a carrier media such as disks, CDs, or DVD-ROMs, on a programmable memory such as read-only memory (firmware), or on a data carriers such as optical or electronic signal carriers. The equipment and its modules of the disclosure can be implemented by hardware circuits such as ultra large scale integrated circuits or gate arrays, semi-conductors such as logic chips and transistors, or programmable hardware equipments such as field programmable gate arrays and programmable logic equipments. They can also be implemented by software executed by various types of processors, or by a combination of above hardware circuits and software, such as firmware.

The above description is only a specific embodiment of the disclosure, but the scope of protection of the disclosure is not limited to this. Any modifications, equivalent substitutions, and improvements made by any skilled person familiar with the technical field within the scope of the disclosure within the spirit and principles of the disclosure should be included in the scope of protection of the disclosure.

What is claimed is:

1. A surface defect detection method, wherein comprising:
S1, an application of LBP operator: before comparing a benchmark image with an actual shot image, a LBP texture feature extraction algorithm is first used for pre-processing the benchmark image and the actual shot image using the LBP operator; and
S2, sift feature-point matching: adding an Sift feature-point matching algorithm, developing a gradient direction formula, calculating key feature points in the image, and matching spatial information of the feature points; and
S3, defect detection: When local feature points of the actual shot image are successfully matched with an image in a benchmark image library, the two images will be compared in detail according to a multi-color fusion comparison method, so as to find out difference points and complete the defect detection; and
the step S2 specifically comprising:
S201, constructing a Gaussian pyramid; and
S202, establishing a DOG Gaussian difference pyramid; and
S203, accurate positioning of key points; and
S204, main direction allocating of the key points; and
S205, features description of the key points; and
S206, completing feature-point matching through the key points matching using an original SIFT algorithm; and
the step S204 specifically comprising: a direction of the key points is actually a gradient direction of local of the image; For key points detected in the DOG difference pyramid, gradient and direction distribution features of pixels within 3σ neighborhood window of the Gaussian pyramid images are collected; Firstly, calculating a image scale space $L(x,y,\sigma)$:
wherein x, y, and σ respectively represent x, y coordinates and dimensions of the pixels;

then calculating an amplitude and direction of the gradient:
the amplitude of the gradient:

$$m(x, y) = \sqrt{(L(x+1, y) - L(x-1, y))^2 + (L(x, y+1) - L(x, y-1))^2};$$

the direction of the gradient:

$$\theta(x, y) = \tan^{-1}\left[\frac{L(x, y+1) - L(x, y-1)}{L(x+1, y) - L(x-1, y)}\right];$$

after calculating all gradient directions of the key points, a gradient direction of the key point with peak value is taken as the main direction, and gradient direction of the key points with 80% higher than the peak value is taken as the auxiliary direction;
recalculating the main direction and the amplitude for key points with multiple gradient directions, the main direction and the auxiliary direction are weighted to calculate a new main direction; As the multiple gradient directions are ultimately merged, each feature point only has one gradient direction, which significantly improves probability of successful feature-point matching.

2. The surface defect detection method according to claim 1, wherein in the step S1, a LBP formula is implemented as follows:

$$LLP_{P,R}^{rot} = \min\{ROR(LBP_{P,R},i)|i=0, \ldots, P-1\}$$

the LBP represents a pixel difference between a pixel point and its surrounding 8 neighboring points, so when light changes, pixel values and surrounding pixel values increase or decrease at the same time, so a pixel-value difference remain unchanged, thus increasing ability to resist external light interference; P represents the number of pixels around the central point, R represents a size of a grid radius, a pixel grid can be expanded to any grid size as needed;
rot refers to different angles of rotation, and ROR $(LBP_{P,R},i)$ refers to rotating of the LBP operator i times in a clockwise direction; the entire formula expresses an idea of continuously rotating a circular neighborhood to obtain a series of initial defined LBP values, and taking a minimum value as the LBP value for neighborhood; this ensures rotational invariance of the image, thereby achieving normal matching with the benchmark image and detection even if an object undergoes certain offset or rotation.

3. The surface defect detection method according to claim 1, wherein the step S205 specifically comprising: for each key point, there are three pieces of information: location, scale, and direction; establishing a descriptor for each key point, describing the key point with a set of vectors, which does not change with various changes; the descriptor not only includes the key point, but also the pixels around the key point contribute to it; the descriptor is a representation of a gradient statistical result of a Gaussian image in a key point neighborhood; By dividing the image area around the key points into blocks and calculating the gradient histogram within the blocks, a unique vector is generated, which is an abstraction of the image information in that area and has uniqueness.

4. A surface defect detection system using the surface defect detection method as claimed in claim 1, wherein comprising:
- a LBP operator module: before comparing the benchmark image with the actual shot image, the LBP texture feature extraction algorithm is first used for pre-processing the benchmark image and the actual shot image using the LBP operator; and
- a Sift feature-point matching module: used to adding the Sift feature-point matching algorithm, calculating the key feature points in the image, and comparing the spatial information of the feature points; and
- a visual self-learning module: simplifying the operation of adding benchmark libraries and reducing difficulty of using the detection system; through the module, users can manually select areas needed to be tested in future; and
- a defect detection module: when the local feature points of the actual shot image are successfully matched with the image in the benchmark image library, the two images will be compared in detail to identify the difference points and complete the defect detection.

5. A computer equipment, wherein the computer equipment comprising a memory and a processor; the memory stores computer programs, when the computer programs are executed by the processor, causing the processor to perform the steps of the surface defect detection method as claimed in claim 1.

* * * * *